United States Patent [11] 3,545,805

[72] Inventor Lorenzo D. Wilson
P.O. Box 121, RFD 01, Necedah, Wisconsin 54646
[21] Appl. No. 783,661
[22] Filed Dec. 13, 1968
[45] Patented Dec. 8, 1970

[54] AUXILIARY SUN VISOR
10 Claims, 8 Drawing Figs.
[52] U.S. Cl. ................................................. 296/97, 24/81; 248/316
[51] Int. Cl. .................................................... B60j 3/02
[50] Field of Search ........................................ 280/150; 296/97; 160/(Auto Digests); 24/81; 248/316

[56] References Cited
UNITED STATES PATENTS
| 728,358 | 5/1903 | Blincoe | 296/97(.16)X |
| 2,033,391 | 3/1936 | Muench | 296/97(.32)X |
| 3,304,118 | 2/1967 | Jonas | 296/97 |
| 3,415,569 | 12/1968 | Leevo | 296/97 |

Primary Examiner—Banjamin Hersh
Assistant Examiner—Leslie J. Paperner
Attorney—Hill, Sherman, Meroni, Gross & Simpson ABSTRACT: An auxiliary visor for use with either or both of two main visors at a vehicle windshield or with a front side window of the vehicle. The auxiliary visor comprises a transparent colored sheet, a supporting strip therefor, two clips on one side of the strip, and a strong T-shaped spring clamp pivoted on the other side thereof. The spring clamp supports the auxiliary visor in operative depending position on one main visor, and when rotated 180°, supports the auxiliary visor in inoperative overlying position on the main visor. The auxiliary visor has another operative position in which it bridges the space between the main visors and is supported by engagement of the clips with a rearview mirror. The auxiliary visor has still another operative position in which it overlies the upper portion of the front side window and is supported by engagement of the clips with the upper edge of the side window.

PATENTED DEC 8 1970
3,545,805
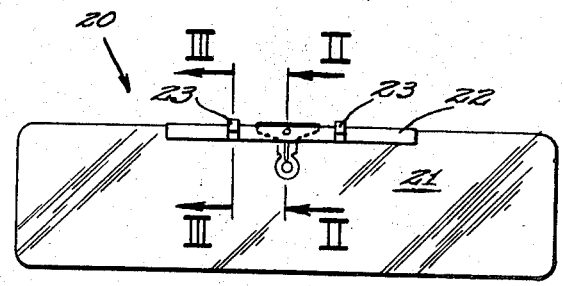
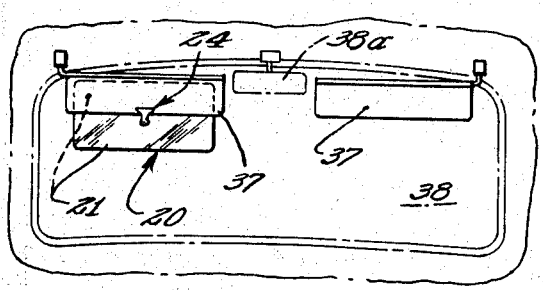
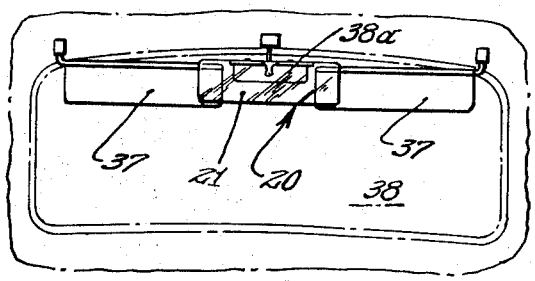
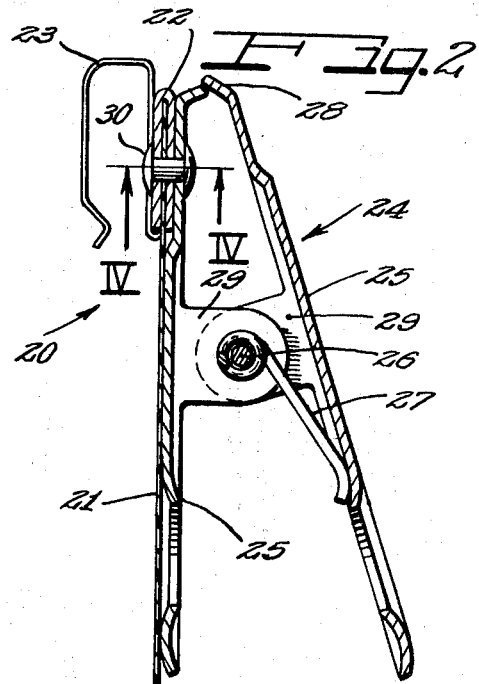
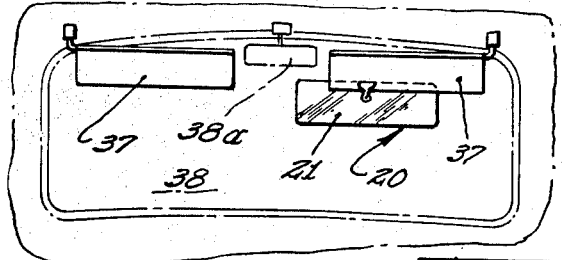
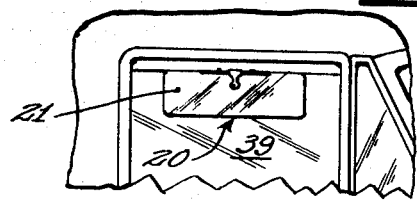
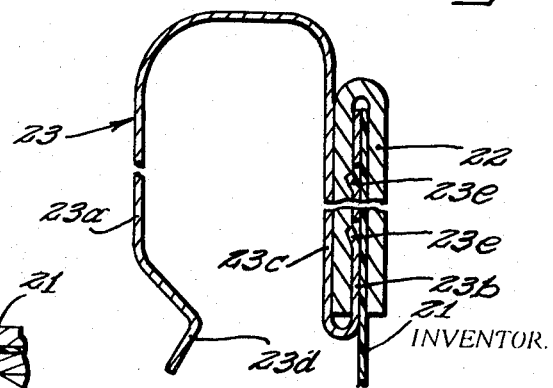
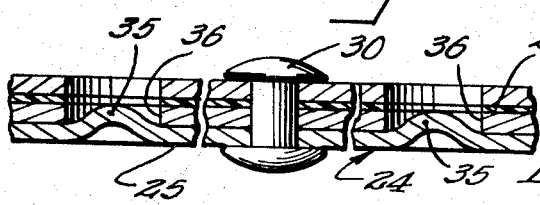
INVENTOR.
Lorenzo D. Wilson
BY
Hill, Sherman, Meroni, Gross & Simpson ATTORNEYS

AUXILIARY SUN VISOR

BACKGROUND OF THE INVENTION

This invention relates to an auxiliary sun visor. More particularly, the invention relates to a visor of this type that may be used with a main visor or visors at a vehicle windshield or with a vehicle window.

Auxiliary visors are known which are used adjacent the driver's seat of a vehicle either by themselves or with other visors from which they may be supported. One difficulty has been that the auxiliary visors have tended to come loose from the main visors because of vibration due to vehicle motion and engine operation. In instances where the support and attachment of one visor on another has been robust enough to withstand vibration, it has been difficult to adapt said support and attachment to adjustment or to ready disconnection of the one visor from the other and reconnection to some other part.

An object of the present invention is to provide a vehicle visor support that is free of the foregoing difficulties. The support of the present invention provides a strong vibration-resisting mounting for an auxiliary visor on a main visor, another mounting for the auxiliary visor on another vehicle part, and a compact arrangement of those mountings so that one mounting may operate without interference by the other mounting.

Other and further important objects of this invention will become apparent from the attached drawing and the detailed description relating thereto.

SUMMARY OF THE INVENTION

An auxiliary visor comprising a transparent colored sheet, a supporting strip therefor, two clips on one side of the strip, and a strong T-shaped spring clip pivoted on the other side of the strip, the clips supporting the auxiliary visor between two main visors on a rear view mirror or on the top of a front vehicle door, the spring clamp supporting the auxiliary visor on one main visor in operative depending position or in inoperative overlying position, depending upon the angle of the spring clamp with respect to the sheet.

BRIEF DESCRIPTION OF THE FIGURES

FIG. 1 is an elevational view of the auxiliary visor of the present invention;

FIG. 2 is a sectional view taken on the line II–II of FIG. 1 showing the mounting of a spring clamp forming part of the auxiliary visor and the attachment of the clamp;

FIG. 3 is a sectional view taken on the line III–III of FIG. 1 showing a clip forming part of the auxiliary visor and the attachment of the clip;

FIG. 4 is a fragmentary sectional view taken on the line IV–IV of FIG. 2 showing how the spring clip is held against angular movement with respect to the rest of the auxiliary visor;

FIG. 5 is a fragmentary elevational view showing the use of the auxiliary visor with a main visor at a vehicle windshield;

FIG. 6 is a view similar to FIG. 5, but showing the use of the auxiliary visor between two main visors;

FIG. 7 is a view similar to FIG. 5, but showing the auxiliary visor supported from the main visor in a somewhat different way; and FIG. 8 is a fragmentary elevational view showing the auxiliary visor applied to the front side window of the vehicle;

As shown in FIGS. 1 and 2, an auxiliary visor 20, of the present invention, comprises an oblong sheet 21 of transparent colored material, a supporting strip 22, two clips 23 and a spring clamp 24. The sheet 21 is oblong, is formed of a suitable material such as plastic or glass, and may be green, orange, blue, slate, or amber in color. Smoked glass will give a color approaching slate. The supporting strip 22 is of U-shape and is attached to one long side of the sheet 21, with the legs of the U embracing and clamping the sheet between them. The supporting strip 22 may be appreciably shorter than the sheet 21 as shown.

As shown in FIGS. 1 and 3, the clips 23 are secured to regions of the supporting strip 22 spaced longitudinally thereof.

Each clip 23 comprises two outer legs 23a and 23b and a middle leg 23c arranged side-by-side. The outer leg 23a is in widely spaced overlapping relation with the middle leg 23c and extends from a juncture with one end of the middle leg 23c. The outer leg 23b extends in the opposite direction from a juncture with the other end of the middle leg 23c in closely spaced overlapping relation thereto. The legs 23b and 23c receive one leg of the supporting strip 22 and are secured thereto. The outer leg 23a has near its end a fold 23d directed toward the middle leg 23c. Each clip may be secured to the supporting strip 22 by projections 23e which are punched out of the leg 23c and dig into the inside of the adjacent leg of the supporting strip 22. Each clip 23 is covered at least on the facing sides of the outer leg 23a and the middle leg 23c, a coating of rubber or the like that will prevent scratching of an object inserted between the legs 23a and 23c for clamping. The clamping opening of each clip 23 formed by its legs 23a and 23c is directed toward the edge of the sheet 21 opposite that to which the supporting strip 22 is attached.

As shown in FIGS. 1 and 2, the spring clamp 24 is positioned at the side of the sheet 21 opposite that at which the clips 23 are located and engages the leg of the U of the supporting strip 22 other than the leg thereof to which the clips 23 are attached.

As shown in FIGS. 1 and 2, the spring clamp 24 comprises two complementary T-shaped jaw members 25, a pivot shaft 26, and a spring 27. Each jaw member 25 has a flange 28 which is formed on the head of the T, runs for the length of the head, and is bent out of the plane of the T. Each jaw member 25 has two spaced ears 29 formed opposite one another on the sides of the leg of the T in spaced relation to the head of the T and to the end of the leg of the T opposite the head. The ears 29 project out of the plane of the T in the same direction as the flange 28 on the head of the T. Only one ear 29 is shown for each jaw member 25. The jaw members 25 are arranged with their flanges 28 in engagement at their edges and their ears 29 overlapping. The pivot shaft 26 extends through the four ears 29 on the two jaw members 25. The spring 27 has a coiled portion about the pivot shaft 26 and generally straight portions extending from the coiled portion into engagement with the legs of the jaw members 25. Only one straight portion of the spring 27 is shown in FIG. 2.

As shown in FIGS. 2 and 4, the spring clamp 24 is pivotally connected to the supporting strip 22 by a rivet 30 which goes through both legs of the supporting strip 22, the portion of the sheet 21 clamped between the legs of the supporting strip, and through the head of the T of one jaw member 25. This same jaw member 25 has in the head of the T, two protuberances 35 at opposite sides of, and at equal distances from, the rivet 30. The protuberances 35 are received in openings 36 formed in the legs of the supporting strip 22 and the sheet 21 at opposite sides of, and at equal distances from, the rivet 30. The protuberances 35 and the openings 36 constitute means by which the spring clamp 24 is yieldingly retained in two angular positions 180° apart, one position being that of FIGS. 1, 2, and 5, in which the spring clamp 24 opens outward or away from the long edge of the sheet 21 opposite the long edge to which it is connected, the other position being one in which the spring clip opens toward said opposite edge of the sheet 21. When the spring clip 24 is angularly shifted from one of the aforementioned positions to the other, each protuberance 25 shifts from one opening 36 to the other opening.

One operative position of the auxiliary visor 20 is shown in FIG. 5. In this position the auxiliary visor 20 depends from one of two main visors 37 at a vehicle windshield 38, the one main visor being clamped between the jaw members 25 of the spring clip 24. In this position of the auxiliary visor 20, light coming toward the vehicle operator at a low angle below the main visor is filtered by the sheet 21. The sheet 21 may be cut to a length suiting the main visor 37 when it is to be applied thereto. In the position of FIG. 6, the auxiliary visor 20 is positioned between the two main visors 37 and is held in that position by a rear view mirror 38a which is engaged by the two clips 23. In the position of FIG. 7, the auxiliary visor 20 is below one main visor 37 to which it is secured by the spring clip 24 as well as beyond the end of the one main visor 37 adjacent the other main visor.

In the position of FIG. 8, the auxiliary visor 20 is applied at the side of the vehicle, the clips 22 engaging the upper edge of a front side window 39, so that the light through it near the top is filtered. Alternatively, the clips 23 may be so formed that the legs 23a and 23c have a greater spacing. Thus the clips 23 may be applied to a convertible on which the side window has a thick reinforcing strip at the top of the side window.

When the auxiliary visor 20 is not to be used, the clamp 24 is rotated 180° from the position of FIG. 2 and made to grip the lower edge of the main visor 37 away from the driver's side of the vehicle. With the clamp 24 thus rotated and applied to the said main visor 37, the sheet 21 of the auxiliary visor 20 overlaps the said main visor and is out of the way, as shown in the dotted line portion in FIG. 5.

Although I have herein set forth my invention with respect to certain specific principles and details thereof, it will be understood that these may be varied without departing from the spirit and scope of the invention as set forth in the hereunto appended claims.

I claim:

1. An auxiliary sun visor comprising a sheet of transparent colored material, a supporting strip member attached to and extending along a first edge of the sheet, a pair of clips located at one side of the sheet and attached to the supporting strip member at regions thereof spaced lengthwise thereof, and a spring clamp positioned at the other side of the sheet and connected to the supporting strip member for pivoting about an axis transverse to the plane of the sheet and located between the previously mentioned clips, the spring clamp being yieldingly retained in either of two positions 180° apart about the pivot axis, the clamp opening toward a second edge of the sheet opposite said first edge in one of said two positions and away from said second edge in the other of said two positions.

2. An auxiliary sun visor according to claim 1, the spring clamp comprising a pair of opposed T-shaped jaw members, the heads of the T's being engageable with one another throughout the lengths of said heads for gripping purposes, opposite edges of the T of each jaw member having upstanding ears opposite one another in spaced relation to the end of the leg remote from the head, the ears of one jaw member overlapping those of the other jaw member, a pivot shaft extending through the ears to connect the jaw members, and a spring positioned on the shaft and acting against the legs of the T's to firmly press the heads thereof against one another, the ends of the legs of the jaw member remote from the heads being engageable by an operator's hand for movement of said ends toward one another against the action of the spring and for movement of the heads away from one another to release the gripping action thereof.

3. An auxiliary sun visor according to claim 2, one jaw member of the spring clip lying on the sheet and the supporting strip member, the pivotal connection between the spring clip and the supporting strip member being formed by a rivet extending through said one jaw member, the supporting strip member, and the sheet.

4. An auxiliary sun visor according to claim 3, there being two recesses and two protuberances cooperating therewith on said one jaw member and the supporting strip member to determine the said two positions of the spring clip, the two recesses being on one of said members at equal distances from and at opposite sides of the pivot connection between said members, the two protuberances being on the other of said members at opposite sides of the pivot connection at the same distance therefrom as the two recesses.

5. An auxiliary sun visor comprising a sheet of transparent colored material, a supporting strip member attached to and extending along a first edge of the sheet, a pair of clips located at one side of the sheet and attached to the strip member at regions spaced therealong, the clips being so oriented as to have their openings directed toward a second edge of the sheet opposite said first edge and being adapted to engage the upper edge of a rearview mirror for shielding a space between two main visors in which space the mirror lies, a spring clamp located at the side of the sheet opposite the pair of clips and attached to the supporting strip member at a region between the pair of clips for pivoting about an axis transverse to the sheet, the spring clamp being engageable with the lower edge of either main visor and being yieldingly retained in either of two positions 180° apart, the sheet when operative depending from the associated main visor with the spring clamp in one of its said two positions, the sheet when inoperative overlying the associated main visor with the spring clamp in the other of its said two positions.

6. An auxiliary sun visor according to claim 5, the supporting strip member being U-shaped and embracing said first edge of the sheet, the pair of clips being attached to one leg of the U of the supporting strip member, the spring clamp being attached to the other leg of the U.

7. An auxiliary sun visor according to claim 6, the spring clamp compressing opposed T-shaped jaw members pivotally connected to one another on an axis located between the heads of the T's and the ends of the legs thereof remote from the heads, the heads of the T's being engageable with one another throughout their lengths for gripping purposes, the ends of the legs remote from the heads being engageable by an operator's hand for movement of said ends toward one another and for movement of the heads of the T's away from one another to release the gripping action thereof.

8. An auxiliary sun visor comprising a generally oblong sheet of transparent colored material, a U-shaped strip embracing a portion on one long edge of the sheet, the strip being shorter than the said one long edge, a pair of clips positioned at regions of the strip spaced lengthwise thereof, each clip comprising two outer legs and a middle leg arranged side-by-side one outer leg extending in one direction from a juncture with one end of the middle leg, the other outer leg extending in the opposite direction from a juncture with the other end of the middle leg, each clip being attached to one leg of the strip, the middle leg and one outer leg of each clip embracing the said one leg of the strip, and a spring clamp located at the outer side of the other leg of the strip and pivotally connected to the strip at a region intermediate its ends on an axis transverse to the legs of the strip, the said other leg of the strip having first and second recesses equally spaced from the said axis at opposite sides thereof, the spring clamp having first and second protuberances at opposite sides of said pivot axis at a spacing therefrom equal to that of the recesses in the strip, the protuberances being releasably engageable with the recesses yieldingly to hold the spring clamp in two portions 180° apart with respect to the strip and the sheet, one position involving opening of the spring clamp toward the said other long edge of the sheet and engagement of the first protuberance and the second protuberance with the first recess and the second recess, respectively, the other position involving opening of the spring clamp away from the said other long edge of the sheet and engagement of the second protuberance and the first protuberance with the first recess and the second recess, respectively, the spring clamp comprising opposed jaw members having at one end flanges engageable with one another for gripping purposes, the ends of the legs of the jaw members remote from the flanges thereof being engageable by an operator's hand for movement of said ends toward one another against the action of the spring and for movement of the flanges away from one another to release the gripping action thereof.

9. An auxiliary sun visor according to claim 8, each jaw member of the spring clamp being of T-shape and having a flange and two ears, the flange extending from the head of the T for the length of said head out of the plane of the T, the ears extending from the sides of the leg of the T in the same direction from the plane of the T as the flange, the ears being opposite one another and spaced from the head of the T and from the end of the leg of the T remote from the head, the jaw members being positioned with the edges of the flanges engageable throughout their lengths and the ears of one jaw member overlapping the ears of the other jaw member, a shaft extending through the ears so as to connect the jaw member for relative pivoting, and a spring for firmly urging the edges of the flanges against one another, said spring being coiled about the shaft and having ends projecting therefrom into engagement with the legs of the jaw members.

10. An auxiliary sun visor according to claim 9, the pivot connection between the spring clip and U-shaped strip being formed by a rivet passing through the head of the T of one jaw member of the spring clip, the sheet, and both legs of the U-shaped strip.